Nov. 6, 1923.　　　　　　　　　　　　　1,472,798

T. A. GYLLSDORFF

REAMER

Filed Dec. 27, 1920

Torsten A. Gyllsdorff INVENTOR.

BY Edward N. Pagelsen ATTORNEY.

Patented Nov. 6, 1923.

1,472,798

UNITED STATES PATENT OFFICE.

TORSTEN A. GYLLSDORFF, OF DETROIT, MICHIGAN, ASSIGNOR TO STANDARD REAMER & TOOL COMPANY, OF DETROIT, MICHIGAN, A CORPORATION OF MICHIGAN.

REAMER.

Application filed December 27, 1920. Serial No. 433,352.

*To all whom it may concern:*

Be it known that I, TORSTEN A. GYLLSDORFF, a citizen of the United States, and residing at Detroit, in the county of Wayne and State of Michigan, have invented a new and Improved Reamer, of which the following is a specification.

This invention relates to rotatable cutting tools, especially reamers and similar end-cutters which are provided with longitudinal teeth and which cut with the ends of such teeth, and the object of this invention is to provide a tool of this character wherein the cutting end can be replaced at low cost when worn.

Reamers and similar rotating end-cutting tools in which the teeth are longitudinal of the body, whether spiral or not, are usually ground slightly tapering, the cutting end being a few thousandths of an inch larger in diameter than the upper or grinding portion. When this cutting end becomes worn, it is necessary to regrind the entire tool to the next smaller working size in order to again obtain an available tool. Usually, the lower ends alone of all the teeth become worn, the remainder of the teeth remaining unworn as they serve merely to hold the tool true and to guide the shavings. As but a very small fraction of the tool therefore is used for cutting, and as the cost of the high-speed steels now used for reamers and the like is very high, the actual waste is a very great factor in the cost of work.

My invention consists in a tool of the reamer type having a body of lower grade steel and a collar of high-speed steel on its lower or operative end, and means to rigidly attach this collar to the end of the body.

It further consists in the details of construction illustrated in the accompanying drawing and particularly pointed out in the claim.

Figure 1:
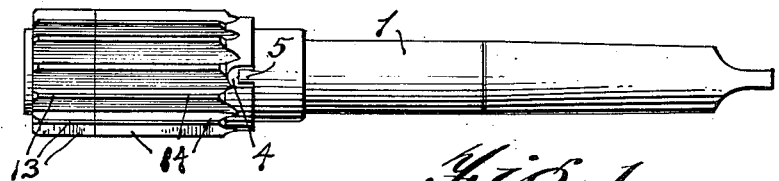
Figure 2:
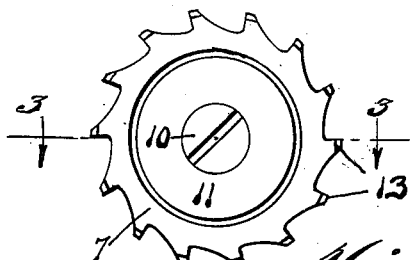
Figure 4:
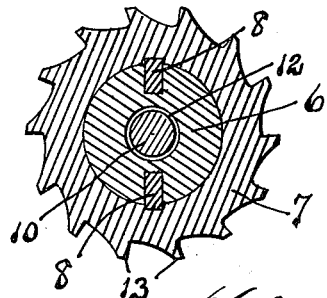
Figure 3:
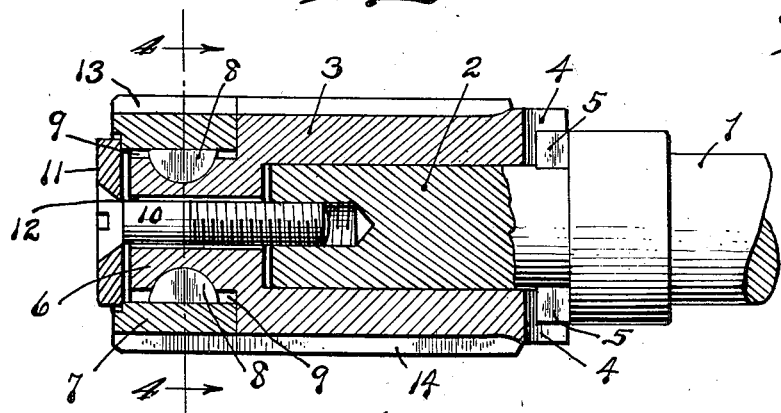

In the drawing, Fig. 1 is an elevation of a reamer embodying the present invention. Fig. 2 is an end elevation thereof. Fig. 3 is a section on the line 3—3 of Fig. 2. Fig. 4 is a section on the line 4—4 of Fig. 3.

Similar reference characters refer to like parts throughout the several views.

The shank 1 shown in the drawing has a reduced end 2 which extends into the central bore of the cylindrical body 3 of the reamer, the body having notches 4 into which the usual driving pins 5 of the shank extend. It is to be understood that the body and shank may be made integral if desired. The body has a reduced end or hub 6 on which fits the collar 7 of high-speed steel, any desired means being provided for driving the collar by the hub 6, keys 8 mounted in seats in the hub and extending into the key grooves 9 of the collar being shown.

A screw 10 is shown extending through a washer 11, through a central bore 12 in the hub 6 and screw threaded into the reduced end 2 of the shank to hold the collar in position. While I have shown the teeth 13 of the collar 7 longitudinal of the reamer and continuous with the teeth 14 on the body 3, I do not wish to be limited thereto as any other desired type of teeth may be employed.

The body 3 of the reamer will usually be made of ordinary tool steel or of case hardened machine steel as it has little to do besides centering the reamer and its flutings serve as conduits for shavings. The wear on the teeth is so slight that they seldom need regrinding. The wear on the teeth 13 of the collar 7, however, is heavy and regrinding is frequently necessary so that the collar soon becomes worn out. It may then be replaced by another of full size and the worn collar may be ground down to the next available size. The loss is therefore but a small fraction of what it would be if the entire tool had to be ground down.

The details of the connection between the collar 7 and the body, the details of construction of the teeth and the proportions of the parts may all be changed by skilled tool makers without departing from the spirit of my invention as set forth in the following claim.

I claim:—

A reamer comprising a substantially cylindrical body of low-grade steel having a hub at one end and a central bore at the other, said hub having a central bore of less diameter than the bore of the body and also having longitudinal key seats, keys in said seats, a cutter end of high-grade steel mounted on said hub and having key-grooves to receive the keys, a driving shank extending into said bore in the body and having a threaded central hole, and means embodying a screw bearing against the cutter end and extending through the bore of the hub into the hole in the shank to hold the cutter end in position, said cutter end and body having registering longitudinal teeth.

TORSTEN A. GYLLSDORFF.